US005796982A

United States Patent [19]

Iwami et al.

[11] Patent Number: 5,796,982
[45] Date of Patent: Aug. 18, 1998

[54] SWITCHING REGULATOR, AN INFORMATION PROCESSING APPARATUS AND A CONTROL METHOD FOR THE SAME

[75] Inventors: Tomoyuki Iwami; Izuru Narita, both of Sagamihara, Japan

[73] Assignee: International Business Machines Corporation, Armonk, N.Y.

[21] Appl. No.: 508,496

[22] Filed: Jul. 28, 1995

[30] Foreign Application Priority Data

Jul. 29, 1994 [JP] Japan .................. 6-178204

[51] Int. Cl.⁶ ........................... G05F 1/61
[52] U.S. Cl. ................ 395/500; 395/750.01; 364/489; 323/281
[58] Field of Search .................. 364/488, 489; 340/784; 345/94, 211, 103; 395/575, 500, 750.01; 363/23, 49; 323/282, 284, 285, 271, 266

[56] References Cited

U.S. PATENT DOCUMENTS

| | | | |
|---|---|---|---|
| 5,124,906 | 6/1992 | Kang | 363/21 |
| 5,130,703 | 7/1992 | Fairbanks et al. | 340/784 |
| 5,166,538 | 11/1992 | Norton | 307/10.1 |
| 5,216,353 | 6/1993 | Mori | 323/266 |
| 5,321,349 | 6/1994 | Chang | 323/297 |
| 5,420,481 | 5/1995 | McCanney | 315/291 |

FOREIGN PATENT DOCUMENTS 5-4024  8/1987  Japan.

OTHER PUBLICATIONS

Lin et al., "Function Control—A Novel Strategy to Achieve Improval Performance of the DC–DC Switching Regulations", IEEE, 1991, pp. 971–976.

*Primary Examiner*—Kevin J. Teska
*Assistant Examiner*—Thai Phan
*Attorney, Agent, or Firm*—Lawrence D. Cutter

[57] ABSTRACT

An information processing device, such as a notebook computer, having a plurality of subsystems requiring power input, is provided with a switching regulator for supplying power to these various subsystems. The switching regulator is controlled by a feedback voltage which is selected to be a minimum value from amongst the various power lines present.

9 Claims, 6 Drawing Sheets

SWITCHING REGULATOR, AN INFORMATION PROCESSING APPARATUS AND A CONTROL METHOD FOR THE SAME

FIELD OF THE INVENTION

The present invention relates to a switching regulator that is mounted along a power supply line in an information processing apparatus, and to an information processing apparatus and a control method for it; and in particular to a switching regulator that is employed in an information processing apparatus, such as a notebook computer, for which low power consumption is a requirement, and to an information processing apparatus and a control method for it. More specifically, the present invention pertains to an information processing apparatus that comprises a plurality of electric circuits and that has a power supply line for each of the electric circuits.

DESCRIPTION OF THE BACKGROUND

Portable computers, for which portability is taken into consideration, that are compactly and lightly constructed by employing recently developed techniques are now widely used. Among such portable computers, the most popular are notebook computers that employ an LCD display which is mounted in a cover that can be opened and closed.

Figure 5:
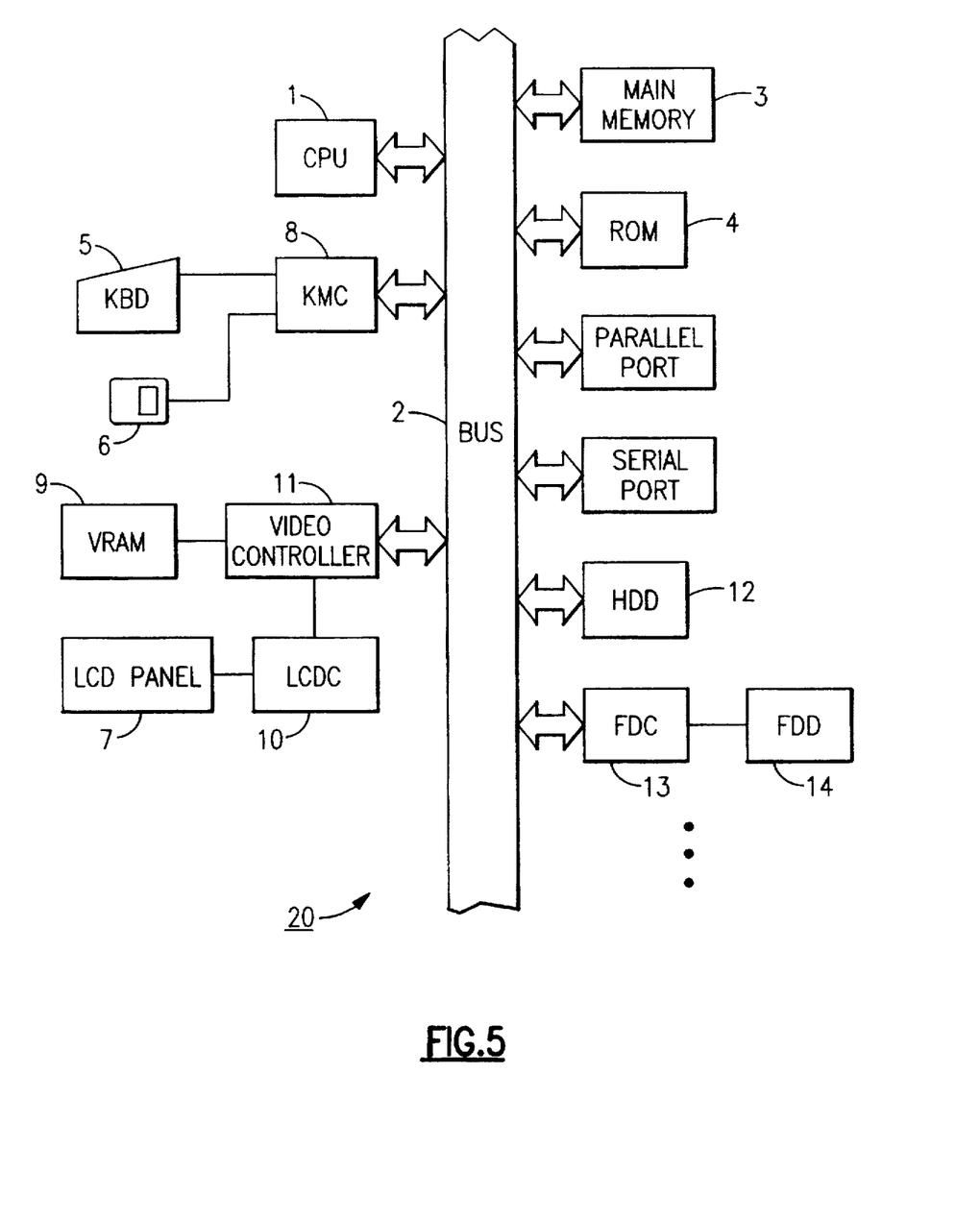
FIG. 5 is a schematic diagram illustrating the data stream aspect of the hardware arrangement of a portable computer.

FIG. 5 is a schematic diagram illustrating the hardware arrangement of such a portable computer in view of the data stream. The arrangement in FIG. 5 will be briefly explained below.

A main CPU 1 that controls all the processing of a system 20 is so connected to a bus 2 that it communicates with memory devices, such as a main memory 3 and a ROM 4, with input devices, such as a keyboard 5 and a mouse 6, with a display device, such as a liquid crystal display (LCD) panel 7, and with other peripheral devices. The main memory 3, which is usually a volatile memory such as DRAM, is employed for loading an OS and various application programs after the system 20 is activated, or as a work area where the main CPU 1 executes a task. The ROM 4, which is a read only memory in which are stored data that are determined during the manufacturing process, is employed to store a BIOS or other firmware. The keyboard 5 and the mouse 6 enable console input and coordinate input, respectively, and through them, signals are to be transmitted to the main CPU 1 via a keyboard/mouse controller (KMC) 8. The LCD 7 is controlled by a liquid crystal display controller (LCDC) 10 and displays the data that are written in a VRAM 9, which serves as a screen buffer. A video controller 11, which is, for example, a VGA (Video Graphic Adapter), writes screen data to the VRAM 9 according to the commands issued by the main CPU 1. Peripheral devices that are connected to the I/O bus 2 are a hard disk drive (HDD) 12 and a floppy disk drive (FDD) 14, both of which serve as external storage devices. The FDD 14 is normally controlled by a floppy disk controller (FDC) 13.

Besides the hardware components shown in FIG. 5, a commercially available portable computer actually includes many I/Fs (interfaces). As such an arrangement is well known by one having ordinary skill in the art, to facilitate the explanation for this example these interfaces are not shown.

Figure 6:
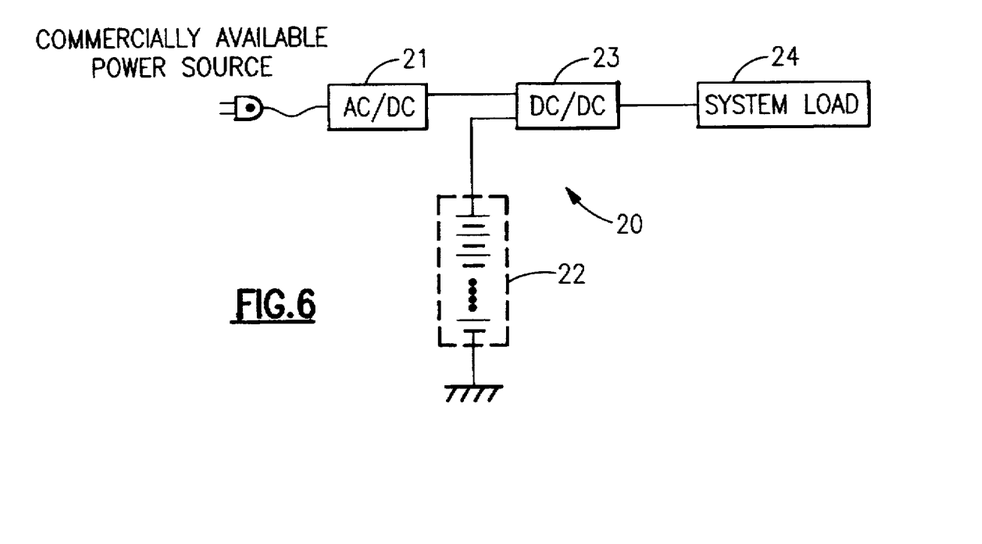
FIG. 6 is a schematic diagram illustrating the power supply system aspect of the hardware arrangement of a portable computer.

FIG. 6 is a schematic diagram illustrating the hardware arrangement of a portable computer in view of the power supply routes. The arrangement in FIG. 6 will now be briefly described.

Generally, power to the system 20 is supplied either from a commercially available power source via an AC/DC adapter 21, or from a battery 22 that is mounted in the system 20. The AC/DC adapter 21, which converts an alternate current from an AC voltage into a DC voltage so that the system 20 can use, usually has an output voltage of about 20 V. A chargeable battery, such as a Nickel Metal-Hydride (NIMH) battery, is employed for the battery 22. Since a plurality of battery cells are connected in series, battery 22 usually has an output voltage of around 10 V. A system load 24 is the hardware components in the system 20 that consume power. A DC/DC converter 23 controls a power voltage $V_{cc}$ that is to be supplied for the system load 24. More specifically, the DC/DC converter 23 reduces a voltage of 20 V that is outputted by the AC/DC adapter 21, or the voltage of 10 V that is outputted by the battery 22 to 5 V (or 3 V), which is appropriate for the operation of the system 20, and also maintains a constant voltage level.

Figure 7:
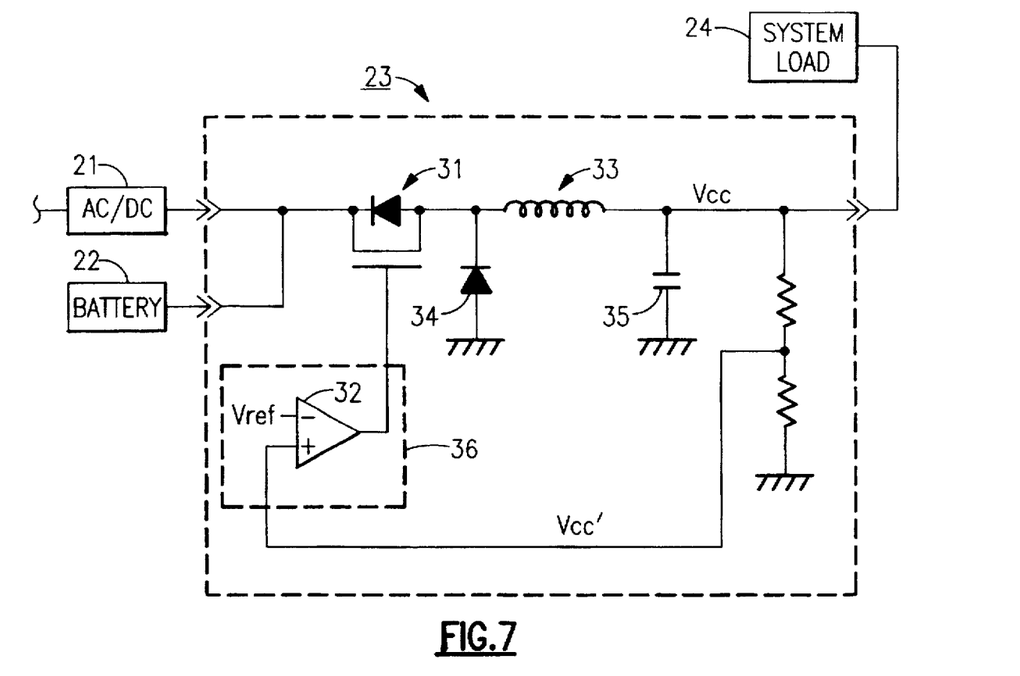
FIG. 7 is a schematic diagram illustrating the internal arrangement of a conventional DC/DC converter 23.

FIG. 7 is a schematic diagram showing the internal arrangement of a conventional DC/DC converter 23. The arrangement in FIG. 7 will now be briefly described.

Switching of a P-channel FET 31 is controlled based on the output of a regulator IC 36. The regulator IC 36 includes a differential amplifier 32, which receives a predetermined reference voltage $V_{ref}$ at its inverted input terminal and a feedback voltage $V_{CC}'$ at its non-inverted input terminal. The reference voltage $V_{ref}$ is a value that is generated by the regulator IC 36. The feedback voltage $V_{CC}'$ is obtained by bringing out the output voltage $V_{CC}$ of the DC/DC converter 23 between paired pull-down resistors. Therefore, $V_{CC}'$ can be kept to a desired level by the resistance ratio for the paired pull-down resistors.

When the feedback voltage $V_{CC}'$ falls below the reference voltage $V_{ref}$, the output of the differential amplifier 32 goes low, and in response to this, the output of the FET 31 is turned on to prepare it to receive power from the external power source 21 or 22. When the feedback voltage $V_{CC}'$ rises above the reference voltage $V_{ref}$ the output of the differential amplifier 32 goes high, and in response to this output, the FET 31 is turned off so that the power supply from the power source 21 or 22 is halted. In other words, feedback control is performed upon the connection/disconnection of the external power sources 21 and 22 in order to stabilize the feedback voltage $V_{CC}'$ (and the power voltage $V_{CC}$). The portion, of the DC/DC converter 23, that connects or disconnects the computer system to the external power sources 21 and 22 is called a "switching regulator." A coil 33 is employed to continue feeding a current by inductance even after the FET 31 is turned off. A diode 34 absorbs an electric charge from the grounding face by the inductance of the coil 33 when the FET 31 is turned off. A capacitor 35 stores electric charges temporarily, and supplies them in response to the power consumption of the system load 24.

A portable computer has been developed for the portable and movable outdoor use as one of the purposes. Therefore, power is not always supplied by a commercially available power source, but is also supplied by an incorporated battery pack. The battery pack, however, is compact and has a small capacity and a short service life. Therefore, various ideas on how to provide low power consumption (power management) are reflected in recently produced portable computers.

As an example for power management is an operation, such as "suspend" or "LCD panel OFF," where the power supply to certain electric circuits is shut down in response to the activity of the system. "Suspend" is one of the power management operation, during which the data that are required for the resumption of a task (for example, information on the state of a CPU) are saved in a main memory and then cut off the power supply to all circuits, except for the main memory and its related circuit, is cut off. "Suspend" is executed by the occurrence of such an event as a trigger that "no I/O device activity has been detected for a predetermined time of a period," "hot key input has been detected at a keyboard," or "the remaining battery capacity becomes lower." "LCD panel OFF" is an operation whereby drive power for the LCD is cut off following the closing of a computer cover, etc., regardless of whether or not the system is being operated. Since the LCD is one of the hardware elements that requires the greatest amount of power, "LCD panel OFF" can be regarded as an effective power management operation. These power management operations may be executed by the main CPU 1, or a sub CPU (not shown) that supports the main CPU 1 may be provided for the performance of the power management operations.

Figure 8:
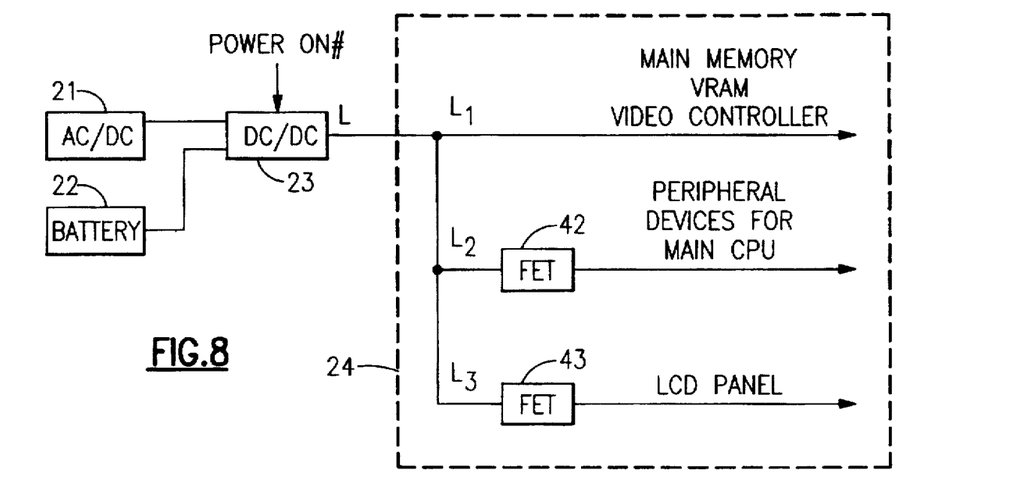
FIG. 8 is a diagram illustrating the arrangement of the power supply system of a portable computer, and more specifically. the arrangement of the power supply system of a portable computer that enables the power supply to only a part of electric circuits to be cut off in order to perform a power management operation. such as "suspend" or "LCD panel OFF".

Since the power supply can be cut off to only a part of electric circuits in "suspend" or "LCD panel OFF," the power supply routes shown in FIG. 8, for example, is employed for a portable computer. The portion enclosed by the dotted lines in FIG. 8 corresponds to the system load 24 shown in FIGS. 6 and 7. More specifically, a power supply line L that extends from the DC/DC converter 23 divides into a power supply line $L_1$, a power supply line $L_2$, and a power supply line $L_3$. The power supply line $L_1$ is connected to the main memory 3, the VRAM 9, and the video controller 11. The power supply line $L_2$ is connected to the main CPU 1 and the peripheral devices (the HDD 13, the FDD 14, etc.) via FET switch 42. The power supply line $L_3$ is connected to the LCD panel 7 via FET switch 43. The power management operations of the system 20 correspond to the switching on or off (by $POWER_{13}ON\#$) of the respective FET switches 42 and 43. The on/off switching of the FET 42 corresponds to a suspend mode and a resume from the suspend mode. The on/off switching of the FET 43 corresponds to an LCD panel off mode and a recovery from the panel off mode. The power supply routes shown in FIG. 8 are also disclosed in, for example, Japanese Examined Utility Model Application No. Hei 05-4024.

In the power supply routes shown in FIG. 8, the amount of current that flows along the power supply lines $L_1$, $L_2$, and $L_3$ differs. Because the operational states of the individual electric circuits that are powered by the corresponding power supply lines are not uniform and change moment by moment. Under these conditions, if, as is shown in FIG. 7, the switching regulator is controlled by employing, as a feedback voltage, only the power voltage $V_{CC}$ that is an output by the DC/DC converter 23, it is difficult to control the switching regulator without wasting power. An explanation for this will be described in further detail while referring to FIG. 9.

Figure 9:
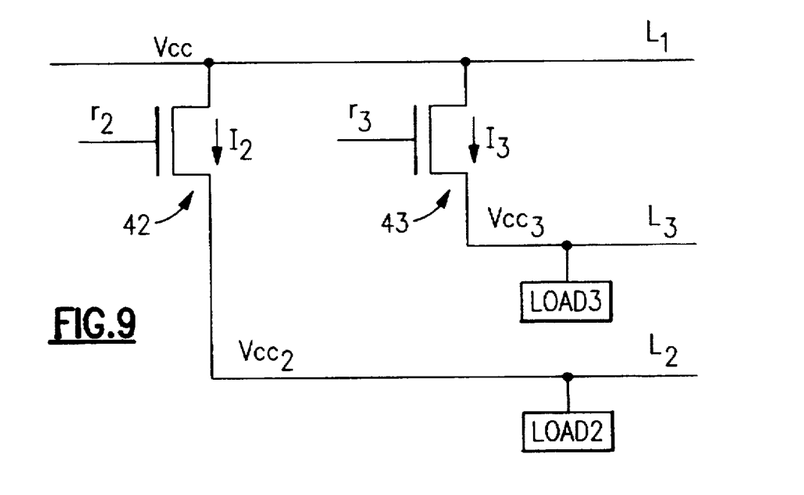
FIG. 9 is an enlarged diagram for the location in FIG. 8 where the power supply line L from the DC/DC converter 23 is branched.

FIG. 9 is a detailed diagram for the portion in FIG. 8 where the power supply line L (=$L_1$) that extends from the DC/DC converter 23 divides into $L_1$, $L_2$, and $L_3$. The respective loads connected with the power supply lines $L_2$ and $L_3$ are named $LOAD_2$ and $LOAD_3$ respectively. The FETs 42 and 43 have ON resistances, even though they are very small (about 50 m$\Omega$). These resistances are defined as $r_2$ and $r_3$. Further, the voltage on the power supply line $L_1$ is defined as $V_{CC}$, the currents that flow along the power supply lines $L_2$ and $L_3$ are defined as $I_2$ and $I_3$, and the voltages that are applied to $LOAD_2$ and $LOAD_3$ are defined as $V_{CC2}$ and $V_{CC3}$. The following expressions (1) and (2) are therefore obviously constructed.

[Expression 1]

$$V_{CC2}=V_{CC}-r_2 I_2 \quad (1)$$

[Expression 2]

$$V_{CC3}=V_{CC}-r_3 I_3 \quad (2)$$

As is described while referring to FIG. 7, the switching regulator employs the power voltage $V_{CC}$ as a feedback voltage and steadily maintains the $V_{CC}$. However, in the above described structure, the conventional switching regulator 36 cannot monitor the voltages $V_{CC2}$ and $V_{CC3}$ that are actually applied to the power supply lines $L_2$ and $L_3$ to which the line L is branched. As is shown by the expressions (1) and (2), the voltages $V_{CC2}$ and $V_{CC3}$ are lower than $V_{CC}$ by the respective voltage drops $r_2 \times I_2$ and $r_3 \times I_3$, which are caused by the FETs 42 and 43. In addition, as described above, the currents $I_2$ and $I_3$ fluctuate according to the operational states of the respective $LOAD_2$ and $LOAD_3$, moment by moment, and this load fluctuation cannot be monitored by the switching regulator 36. The switching regulator 36 can only estimate the maximum currents $I_{2max}$ and $I_{3max}$ that flow across the individual power supply lines.

That is, with the conventional switching regulator, it cannot be determined along which power supply line the most significant voltage drop has occurred and the state falls to the critical. Thus, in order to avoid the entire system 20 being powered down by an event where either $V_{CC2}$ or $V_{CC3}$ falls below the allowable minimum voltage level (i.e., the power spec) required for the operation, the feedback voltage $V_{CC}'$ has to be so predetermined that the power voltage $V_{CC}$ has a margin that is equivalent to a lost voltage value of $r_2 \times I_{2max}$ or $r_3 \times I_{3max}$ and that is based on the supposition that the maximum current amount, $I_{2max}$ or $I_{3max}$ is fed along an individual power supply line. The output voltage $V_{CC}$ of the DC/DC converter 23 is naturally controlled at a voltage level that exceeds the power spec by a lost voltage value. However, the current that flows along the power supply lines does not always require the maximum value, so that a loss in supplied power occurs by a difference between the maximum current value and an actual current value. Such a power loss is a retrogressive and undesired event that runs counter to the current tendency to improve the service life of notebook computer batteries by saving on power consumption.

SUMMARY OF THE PRESENT INVENTION

It is an object of the present invention to provide a switching regulator that is installed along power supply lines in an information processing apparatus, and an information processing apparatus and a method for its control.

It is another object of the present invention to provide a switching regulator for an information processing apparatus, such as a notebook computer that requires low power consumption, and an information processing apparatus and a method for its control.

The present invention is made, above all, for an information processing apparatus that comprises a plurality of electric circuits and that has power supply lines for the individual electric circuits. It is an additional object of the present invention to provide a switching regulator that controls the power that is supplied by an external power source to such an information processing apparatus, while inhibiting power waste, and the information processing apparatus and a method for its control.

To achieve the above described objects, according to a first aspect of the present invention, a switching regulator, which compares a feedback voltage with a previously given reference voltage and controls supplying the power in response to the comparison result. receives a plurality of voltages by employing the minimum received voltage as a feedback voltage.

According to a second aspect of the present invention. an information processing apparatus. which includes a switching regulator that permits or inhibits the power supply from an external power source in response to a feedback voltage. comprises: a first power supply line for supplying power to a first electric circuitry; a second power supply line for supplying power to a second electric circuitry; a i-th power supply line for supplying power to a i-th electric circuitry (i is an integer of $1 \leq i \leq n$, and n is an integer equal to 2 or greather); and feedback voltage selection means for monitoring voltages of the first through the i-th power supply lines and for outputting to the switching regulator, as a feedback voltage. the minimum voltage on one of the power lines along which power is supplied.

According to a third aspect. an information processing apparatus. which is activated by power supplied from an external power source, comprises: a first power supply line for supplying power to a first electric circuitry; a second power supply line for supplying power to a second electric circuitry; a i-th power supply line for supplying power to a i-th electric circuitry (i is an integer of $1 \leq i \leq n$, and n is an integer equal to 2 or greater); means for monitoring a first voltage of the first power supply line; means for monitoring a second voltage of the second power supply line; means for monitoring a i-th voltage of the i-th power supply line; means for selecting the minimum voltage among the first through the i-th voltages; means for comparing the minimum voltage with a previously set reference voltage; and switching means for starting or halting the power supply from the external power source in response to the comparison result.

According to a fourth aspect of the present invention, a control method for an information processing apparatus. which includes a first power supply line for supplying power to a first electric circuitry, a second power supply line for supplying power to a second electric circuitry. a i-th power supply line for supplying power to a i-th electric circuitry (i is an integer of $1 \leq i \leq n$, and n is an integer equal to 2 or greater) and which is activated by power supplied from an external power source, comprises a step of employing, as a feedback voltage, the minimum voltage from among those voltages that are carried across the first through the i-th power supply lines to control the power supply from the external power source.

According to a fifth aspect of the present invention, a control method of an information processing apparatus, which includes a first power supply line for supplying power to a first electric circuitry, a second power supply line for supplying power to a second electric circuitry. a i-th power supply line for supplying power to a i-th electric circuitry (i is an integer of $1 \leq i \leq n$, and n is an integer equal to 2 or greater) and which is activated by power supplied from an external power source, comprises steps of: monitoring a first voltage of the first power supply line; monitoring a second voltage of the second power supply line; monitoring a i-th voltage of the i-th power supply line; selecting the minimum voltage among the first through the i-th voltages; comparing the minimum voltage with a previously set reference voltage; and starting or halting the power supply from the external power source in response to the comparison result.

The switching regulator according to the present invention can employ the minimum received voltage as a feedback voltage. When such a switching regulator is applied for an information processing apparatus that includes a plurality of electric circuits and has power supply lines for the individual electric circuits. the power supply line that is carrying the lowest voltage and that is in a critical state can be regarded as a feedback target and can be changed to another. Further since the lowest voltage can be used for feedback, and as the application of a higher voltage is not required when the security of the system is taken into consideration, so that unnecessary power need not be supplied.

According to an information processing apparatus of the present invention and a method for its control method. the voltages of the first through the i-th power supply lines are monitored and the minimum voltage among them is employed as a feedback voltage to perform the switching on/of a power supply from an external device. Therefore. power supply can be controlled by regarding, as a feedback target. the power supply line that is carrying the lowest voltage and that is in a critical state. Further, since the lowest voltage can be used as a feedback target. the application of a higher voltage is not required when the security of the system is taken into consideration. so that unnecessary power is not supplied.

Other objects. features and advantages of the present invention will become obvious from the following detailed description that is given for one embodiment of the present invention while referring to the accompanying drawings.

BRIEF DESCRIPTION OF THE DRAWINGS

The subject matter which is regarded as the invention is particularly pointed out and distinctly claimed in the concluding portion of the specification. The invention, however, both as to organization and method of practice. together with the further objects and advantages thereof. may best be understood by reference to the following description taken in connection with the accompanying drawings in which:

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

DESCRIPTION OF THE PREFERRED EMBODIMENTS

Figure 1:
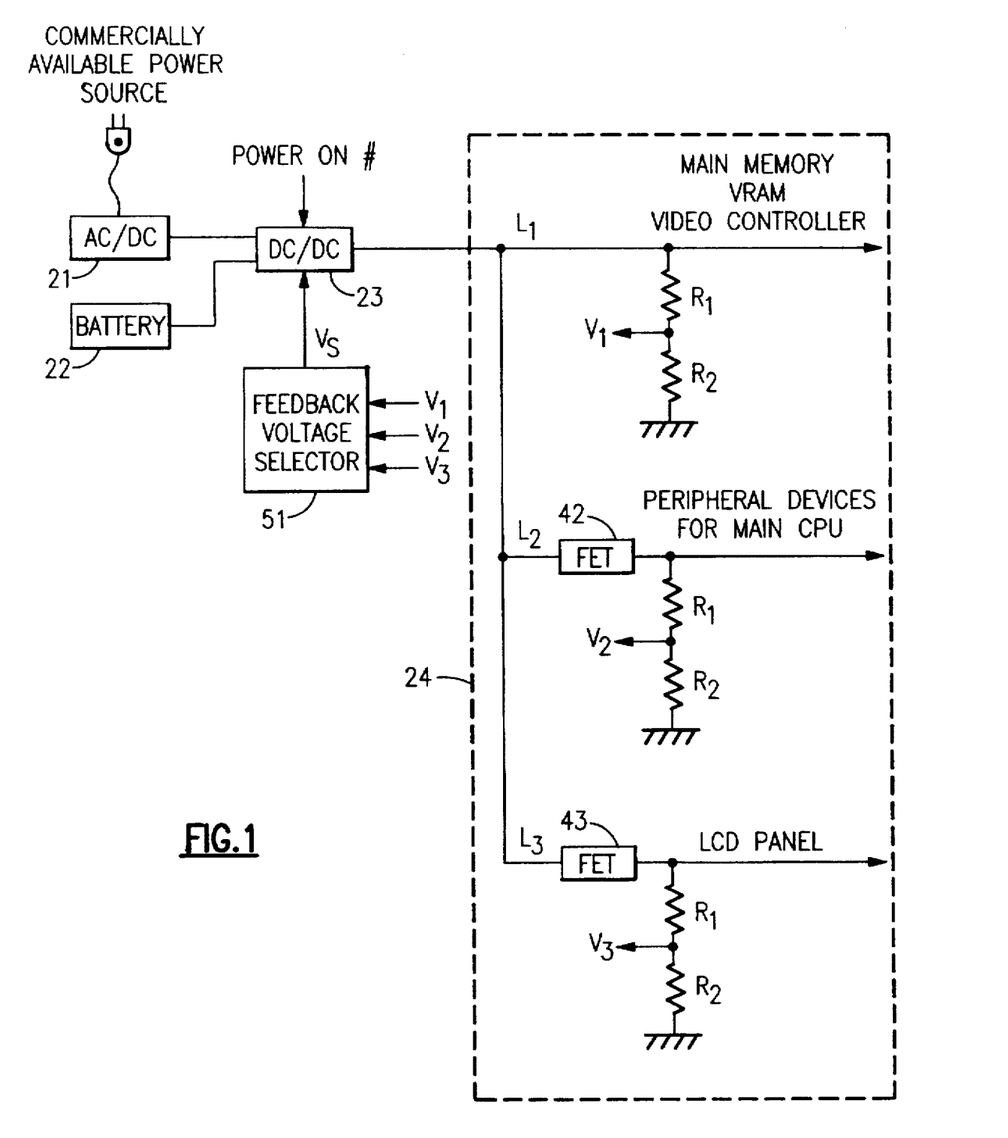
FIG. 1 is a schematic diagram illustrating the power supply system aspect of the hardware arrangement of a portable computer according to one embodiment of the present invention.

For convenience, one embodiment of the present invention will be described along the following items.
A. Power supply system in a portable computer
B. Arrangement and operation of a feedback voltage selector A. Power supply system in a portable computer FIG. 1 is a schematic diagram for the power supply system aspect of the hardware arrangement for a portable computer according to the embodiment of the present invention. The same reference numbers that are used to denote the components in FIGS. 6 and 8 are used to denote identical or corresponding components in FIG. 1.

The first matter in which the arrangement of the power supply system according to this embodiment differ from that of the prior art is that a voltage monitoring means is provided for each of power supply lines $L_1$, $L_2$, and $L_3$. The three voltage monitoring means employ paired pull-down resistors $R_1$ and $R_2$ to perform voltage division and acquire voltages $V_1$, $V_2$, and $V_3$. When a device such as the FET 42 or 43 is provided on the power supply line, voltage monitoring means should be positioned farther than the FETs 42, 43 in order to eliminate the voltage dropped value that is caused by ON resistance of the FETs, 42, 43. The resistors $R_1$ and $R_2$ may be, for example, 10 kΩ resistors. The voltage monitoring means may be any device that can acquire a voltage level from the power supply line, and is not limited to the above arranged one.

The second arrangement difference for the power supply system according to the present invention is the inclusion of a feedback voltage selector 51. The feedback voltage selector 51 receives the outputs $V_1$, $V_2$, and $V_3$ from the three voltage monitoring means, and sends the minimum voltage level to a DC/DC converter 23. The power supply line that carries the minimum voltage can be the power supply line to which the least power is supplied, i.e., the most critical power supply line for continuing the operation of a system 20. The detailed arrangement of the feedback voltage selector 51 will be described in article B.

The third arrangement difference for the power supply system according to the embodiment is that a switching regulator employs the output $V_s$ of the feedback voltage selector 51 as a feedback voltage. As described above, since the feedback voltage selector 51 outputs the minimum voltage among the three input voltages, the voltage for the most critical power supply line can always be fed back regardless of a change in the load.

The monitored voltages $V_2$ and $V_3$ do not include the extra voltage drops that are caused by the respective FETs 42 and 43, as is described above. In addition, as the feedback voltage selector 51 feeds back the lowest voltage of those carried on the power supply lines, the voltage $V_{CC}$ can be controlled by constantly employing as a reference voltage the monitored voltage carried on the most critical power line. Therefore, it is not necessary to determine the higher voltage $V_{CC}$ on a supposition concerning the maximum currents $I_{2max}$ and $I_{3max}$ in order to prevent the voltage $V_{CC}$ from falling below the power spec. In other words, extra power does not have to be supplied.

B. Arrangement and operation of a feedback voltage selector.

Figure 2:
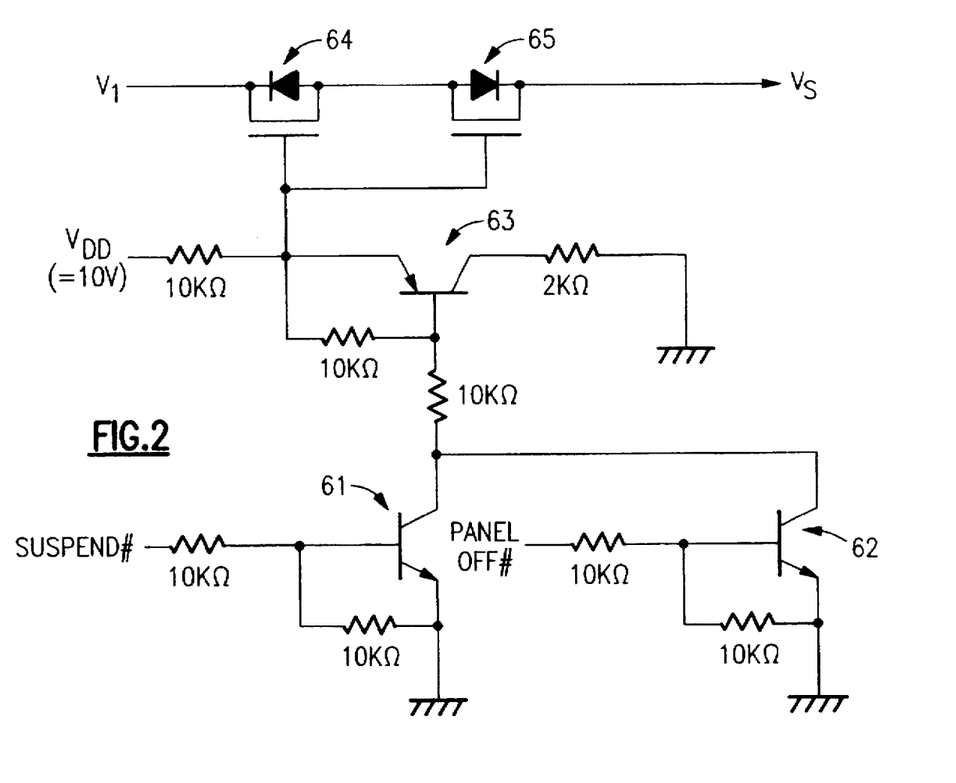
FIG. 2 is a diagram showing an extracted portion of the internal circuiting of a feedback voltage selector, and more specifically. a portion where a monitored voltage $V_1$ for a power supply line $L_1$ is to be processed.
Figure 3:
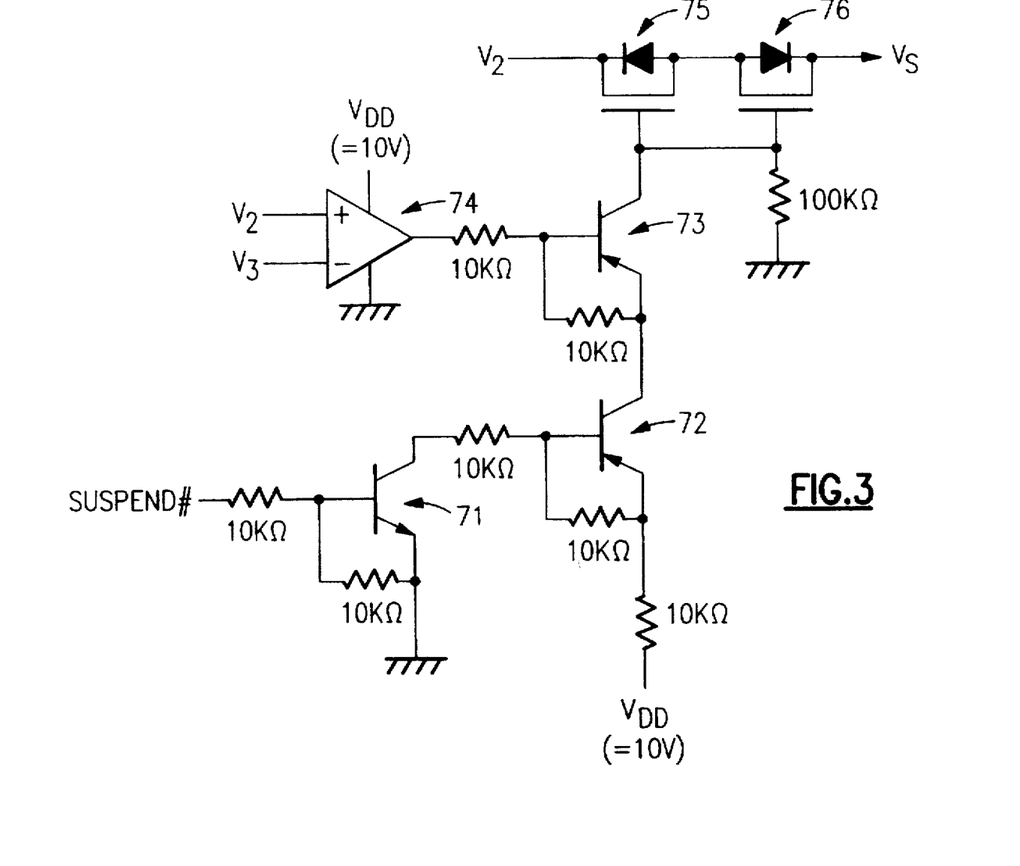
FIG. 3 is a diagram showing an extracted portion of the internal circuiting of a feedback voltage selector, and more specifically. a portion where a monitored voltage $V_2$ for a power supply line $L_2$ is to be processed.
Figure 4:
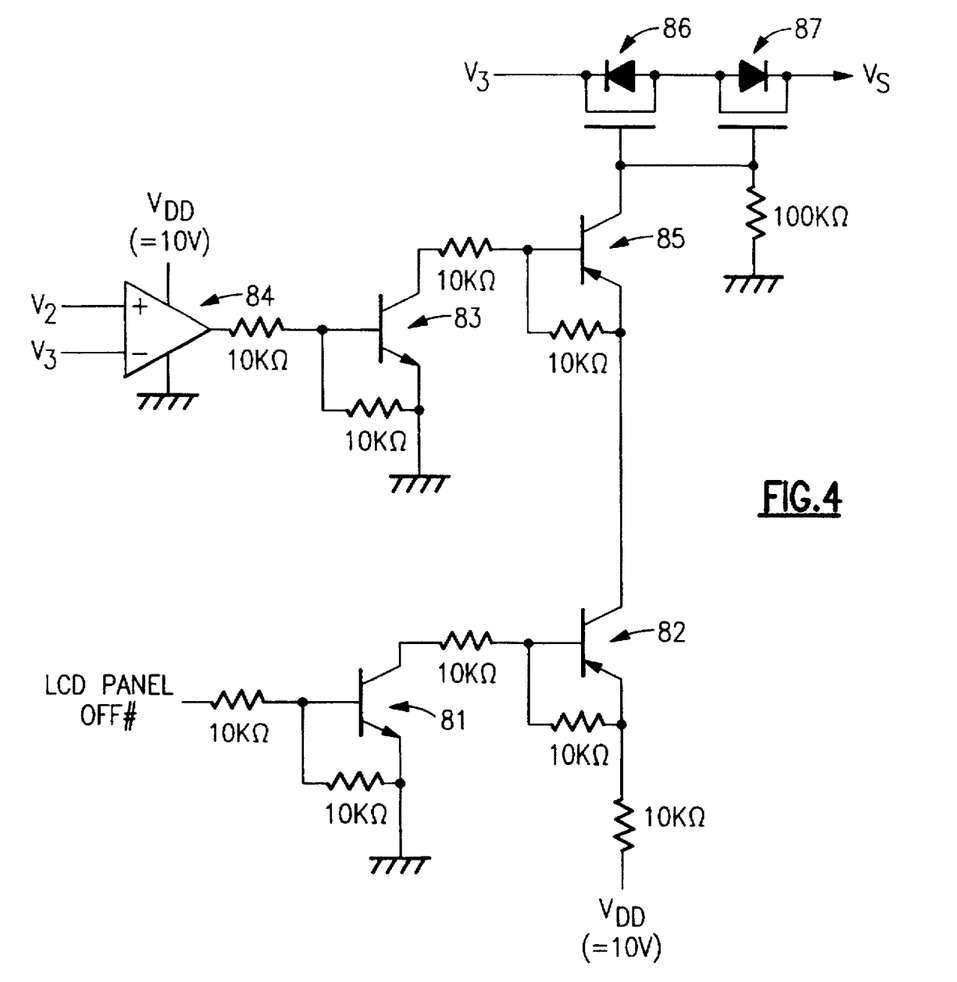
FIG. 4 is a diagram showing an extracted portion of the internal circuiting of a feedback voltage selector, and more specifically. a portion where a monitored voltage $V_3$ for a power supply line $L_3$ is to be processed.

The arrangement and operation of the feedback voltage selector 51 will now be described while referring to FIGS. 2 through 4. It would be understood from the following explanation by one having ordinary skill in the art that the feedback voltage selector 51 selectively outputs the lowest voltage (i.e., the monitored voltage carried on the most critical power supply line) among the three input voltages $V_1$, $V_2$, and $V_3$. In FIGS. 2 through 4, control signals, SUSPEND# and PANEL__OFF#, which are sent from the main CPU 1 or the sub CPU, are employed to turn on and off the FETs 42 and 43 during the power management operation performed by the system 20. The SUSPEND# signal goes high during the normal operation, while it goes low in a suspend mode. The PANEL$_{31}$ OFF# signal goes high during the normal operation and goes low in a panel off mode.

B-1. Processing for monitored voltage $V_1$.

FIG. 2 is a diagram showing a portion of an internal circuit of the feedback voltage selector 51, where the monitored voltage $V_1$ of the power supply line $L_1$ is to be processed. The operational characteristics of the individual elements will be briefly explained.

An npn transistor 61 receives the control signal SUSPEND# at its base and a GND signal at its emitter. An npn transistor 62 receives the control signal PANEL__OFF# at its base and a GND signal at its emitter. In the suspend mode, the base potential of the transistor 61 is demoted, and then the transistor 61 is rendered off, and in the other modes, the base potential of the transistor 61 is promoted, and then the transistor 61 is turned on. Likewise, the transistor 62 is turned off in the panel off mode, and is turned on in the other modes.

A pnp transistor 63 receives a power voltage $V_{DD}$, via a 10 kΩ resistor, at its emitter, the OR-coupled outputs from the collectors of the transistors 61 and 62 at its base, and a GND signal at its collector. Therefore, when either transistor 61 or 62 is in the ON state, the base of the transistor 63 is connected to the GND and a base current flows, and then the transistor 63 is turned on. When both transistors 61 and 62 are in the off state and no current flows across the base of the transistor 63, the transistor 63 is turned off.

The monitored voltage $V_1$, which is one of the feedback voltages, is fed into n-channel FETs 64 and 65, and the selected voltage $V_s$ is output. The gates of the FETs 64 and 65 are connected to the emitter of the transistor 63. Thus, when the transistor 63 is turned on, the gate potentials of the FETs 64 and 65 are pulled down by the GND and inhibited, so that the input voltage $V_1$ is separated from the voltage $V_s$. When the transistor 63 is turned off, the gate potentials are promoted to turn on the FETs 64 and 65, so that the voltage $V_1$ is fed into the FETs 64 and 65 and the voltage $V_3$ is output.

The actual operation of this portion of the circuit will now be explained.

(a) Operation in the suspend mode and the panel off mode

The control signals SUSPEND# and PANEL__OFF# are both active low (previously described). Therefore, only in the suspend and the panel off mode, both of the transistors 61 and 62 are turned off, and the transistor 63 is accordingly turned off. Since the power voltage VDD is cut off from the GND and the gate potentials of the FETs 64 and 65 are maintained high, the FETs 64 and 65 are turned on. The monitored voltage $V_1$ is therefore selected as the feedback voltage $V_s$.

When the FETs 42 and 43 are turned off in FIG. 1, the mode is set to the suspend and the panel off mode. In this case, as the power supply lines $L_2$ and $L_3$ are not in use, the power supply line $L_1$ is the most critical, and therefore the monitored voltage $V_1$ is selected as the feedback voltage.

(b) Operation in neither the suspend mode nor the panel off mode

In this case, at least one of the control signals SUSPEND# and PANEL_OFF# is high. The base of the transistor 63 is pulled down to the GND by at least one of the transistors 61 and 62 and the base current flows turning on the transistor 63. Then, the gate potentials of the FETs 64 and 65 are demoted and the FETs 64 and 65 are turned off, so that the voltage $V_1$, will not be selected as the feedback voltage.

In this operational mode, at least one of the FETs 42 and 43 is turned on in FIG. 1, and at least one of the power supply lines $L_2$ and $L_3$ is in the normal operational state. Since at least one of the lines $L_2$ and $L_3$ is rendered more critical than the line $L_1$ by the voltage drop that is caused by the FET 42 or 43, the voltage $V_1$ is not selected.

B-2. Processing for monitored voltage $V_2$

FIG. 3 is a diagram illustrating a portion of the internal circuit of the feedback voltage selector 51 where the monitored voltage $V_2$ of the power supply line $L_2$ is to be processed. The operational characteristics of the individual elements will be briefly described.

An npn transistor 71 receives the control signal SUSPEND# at its base and a GND at its emitter. The base potential of the transistor 71 is demoted in the suspend mode so that the transistor 71 is turned off, while the base potential is promoted in the other modes, and the transistor 71 is turned on.

A pnp transistor 72 has its base connected to the collector of the transistor 71, and receives the power voltage $V_{DD}$ at its emitter via a 10 kΩ resistor. When the transistor 71 is in the ON state, therefore, the base potential is pulled down by the GND and the base current flows, so that the transistor 72 is also turned on. When the transistor 71 is in the OFF state, the base current does not flow, and the transistor 72 is accordingly turned off.

A pnp transistor 73, which has its emitter connected to the collector of the transistor 72, receives the output of a differential amplifier 74 at its base, and has its collector connected to the gates of the n-channel FETs 75 and 76. The differential amplifier 74 receives the monitored voltage $V_2$ at a non-inverted input terminal and the monitored voltage $V_3$ at an inverted input terminal. When $V_2 > V_3$, a high-level signal is output to turn off the transistor 73. When $V_2 < V_3$, a low-level signal is output to turn on the transistor 73.

The monitored voltage $V_2$, which is one of the feedback voltages, is fed into the n-channel FETs 75 and 76 and the select voltage $V_s$ is output. The gates of the FETs 75 and 76 are connected to the collector of the transistor 73. When the transistor 73 is turned off by the high-level output of the differential amplifier 74, the gate potentials are pulled down to the GND and the FETs 75 and 76 are turned off, so that the input voltage $V_2$ is separated from the select voltage $V_s$. When the transistor 72 is turned off, even though the transistor 73 is turned on by the low-level output of the differential amplifier 74 (i.e., in the suspend mode) the gate potentials are pulled down to the GND and the FETs 75 and 76 are in the OFF state. When the transistor 73 is turned on by the low-level output of the differential amplifier 74 and the transistor 72 is also in the ON state, the gate potentials are promoted by the power voltage $V_{DD}$ and the FETs 75 and 76 are turned on, so that the monitored voltage $V_2$ is fed into the FETs 75 and 76 and the voltage $V_s$ is output.

The actual operation of the portion of the circuit will now be described.

(a) Operation in suspend mode

Since the transistor 72 is always turned off in the suspend mode, as described above, the gate potentials of the FETs 75 and 76 are not promoted. In other words, the monitored voltage $V_2$ will not be selected as the feedback voltage $V_s$.

The suspend mode is the state where the FET 42 is turned off in FIG. 1. The power supply line $L_2$ is not used and does not fall in the critical state, and the feedback of the monitored voltage $V_2$ for the power supply line $L_2$ is not needed.

(b) Operation in other than suspend mode

In the modes other than the suspend mode, the transistors 71 and 72 are in the ON state and the emitter potential of the transistor 73 is in the promoted state. The transistor 73 is turned on by the low-level output of the differential amplifier 74.

Then, its gate potential is promoted by the power voltage $V_{DD}$, the FETs 75 and 76 are turned on, and the monitored voltage $V_2$ is selected as the feedback voltage $V_s$. The low-level output of the differential amplifier 74 occurs when $V_2 < V_3$, i.e., when the state of the power supply line $L_2$ is more critical than the state of the power supply line $L_3$. When $V_2 > V_3$, the differential amplifier 74 does not urge the transistor 73, and the voltage $V_2$ will not be output as the voltage $V_s$. In other words, whichever of the either voltages $V_2$ and $V_3$ that is more critical is output as the voltage $V_s$.

B-3. Processing of the monitored voltage $V_3$

FIG. 4 is a diagram showing a portion of the internal circuit of the feedback voltage selector 51 where the monitored voltage $V_3$ of the power supply line $L_3$ is to be processed. The operational characteristics of the components will be briefly described.

An npn transistor 81 receives the control signal PANEL_OFF# at its base and its emitter is connected to the GND. The base potential of the transistor 81 is demoted the panel off the transistor 81 is turned off, while in the other modes, the base potential is promoted and the transistor 81 is turned on.

The base of a pnp transistor 82 is connected to the collector of the transistor 81 and the power voltage $V_{DD}$ is received at its emitter. When the transistor 81 is in the ON state, its base potential is pulled down to the GND and the base current flows, so that the transistor 82 is turned on. When the transistor 81 is in the OFF state, the base current does not flow, so that the transistor 82 is turned off.

An npn transistor 83 has its emitter connected to the GND and receives the output of a differential amplifier 84 at its base. The differential amplifier 84 receives the monitored voltage $V_2$ at its non-inverted input terminal, and the monitored voltage $V_3$ at its inverted input terminal. When $V_2 > V_3$, the differential amplifier 84 outputs a high-level voltage to turn on the transistor 83. When $V_2 < V_3$, the differential amplifier 84 outputs a low-level voltage to turn off the transistor 83.

The emitter of a pnp transistor 85 is connected to the collector of the transistor 82, and its base is connected to the collector of the transistor 83. With the high-level output of the differential amplifier 84, the transistor 83 is turned on and the base potential of the transistor 85 is pulled down to the GND turning on the transistor 85. With the low-level output of the differential amplifier 84, the transistor 85 is turned off.

The monitored voltage $V_3$, which is one of the feedback voltages, is fed into n-channel FETs 86 and 87 and the select voltage $V_s$ is output. The gates of the FETs 86 and 87 are connected to the collector of the transistor 85. Thus, when the transistor 83 is turned off by the low-level output of the differential amplifier 84, the gate potentials of the FETs 86 and 87 are pulled down by the GND, so that the FETs 86 and 87 are turned off and the input voltage $V_3$ is separated from the voltage $V_s$. When the transistor 82 is turned off, even though the transistor 85 is turned on by the high-level output of the differential amplifier 84 (i.e., in the panel off mode), the gate potentials are pulled down to the GND, and the FETs 86 and 87 are in the OFF state. When the transistor 85 is turned on by the high-level output of the differential amplifier 84 and the transistor 82 is also in the ON state, the gate potentials are promoted by the power voltage $V_{DD}$ and the FETs 86 and 87 are turned on, so that the monitored voltage $V_3$ is fed into the FETs 86 and 87 and the voltage $V_s$ is output.

The actual operation of the portion of the circuit will now be described.

(a) Operation in panel off mode

Since the transistor 82 is always off in the panel off mode, as described above, the gate potentials of the FETs 86 and 87 will not be promoted. In other words, the monitored voltage $V_3$ will not be selected as the feedback voltage $V_s$.

The panel off mode is the state where the FET 43 is turned off in FIG. 1. The power supply line $L_3$ is not used and does not fall into the critical state, and the feedback of the monitored voltage $V_3$ for the power supply line $L_3$ is not needed.

(b) Operation in other than panel off modes

In the modes other than the panel off mode, the transistors 81 and 82 are in the ON state and the emitter potential of the transistor 85 is in the promoted state. The transistor 85 is turned on by the high-level output of the differential amplifier 84. Then, its gate potential is promoted by the power voltage $V_{DD}$, the FETs 86 and 87 are turned on, and the monitored voltage $V_3$ is selected as the feedback voltage $V_s$. The high-level output of the amplifier 84 occurs when $V_2 > V_3$, i.e., when the state of the power supply line $L_3$ is more critical than the state of the power supply line $L_2$. When $V_2 < V_3$, the differential amplifier 84 does not promote the FET 86 and 87, and the voltage $V_3$ will not be output as the voltage $V_s$.

In other words, whichever of the voltages $V_2$ and $V_3$ that is more critical is output as the voltage $V_s$.

The present invention has been explained by referring to the above described embodiment. It would be obvious to one having ordinary skill in the art that modifications or alterations of the above embodiment are possible that are within the scope of the claims of the present invention. In other words, although the present invention has been disclosed by employing the preferred embodiment, it is not thereby so limited. To understand the subject of the present invention, the claims are described the beginning should be referred to.

As described above in detail, according to the switching regulator of the present invention, the minimum voltage of a plurality of input voltages can be employed as a feedback voltage. If this switching regulator is employed for an information processing apparatus that comprises a plurality of electric circuits and has power supply lines for the individual electric circuits, the power supply line which is in the most critical state and is carrying the lowest voltage is employed as a feedback target to perform the switching control.

According to an information processing apparatus and its control method of the present invention, the voltages for the first through n-th power supply lines are monitored, and the minimum voltage of the first through n-th voltages is employed as a feedback voltage to provide switching control for a power supply from an external power source. Therefore, the power supply line that is in the most critical state and is carrying the minimum voltage is selected from the first through n-th power supply lines as a feedback target, and power supply can thereby be controlled. Further, as the lowest voltage can be used as a feedback target, the application of a high voltage is not required even if the safety of the system is taken into consideration and power will not be wasted.

The invention claimed is:

1. A switching regulator, which compares a feedback voltage with a previously given reference voltage and which controls supplying the power in response to the comparison result, the regulator including means for receiving a plurality of feedback voltages and for selecting the minimum received voltage as a feedback voltage for said comparison.

2. An information processing apparatus, which includes a switching regulator that permits or inhibits electrical power being supplied from an external power source in response to a feedback voltage, said information processing apparatus comprising:

a first power supply line for supplying power to a first electric circuit;

a second power supply line for supplying power to a second electric circuit;

an $i_{th}$ power supply line for supplying power to an $i^{th}$ electric circuit, i being an integer between 1 and n and wherein n is an integer at least equal to 2; and feedback voltage selection means for monitoring voltages of said first through said $i^{th}$ power supply lines and for outputting to said switching regulator, as a feedback voltage, the minimum voltage on one of said power lines through which power is supplied.

3. An information processing apparatus, which is activated by power supplied from an external power source, said apparatus comprising:

a first power supply line for supplying power to a first electric circuit;

a second power supply line for supplying power to a second electric circuit;

an $i^{th}$ power supply line for supplying power to an $i^{th}$ electric circuit, i being an integer between 1 and n, and wherein n is an integer at least equal to 2;

means for monitoring a first voltage of said first power supply line;

means for monitoring a second voltage of said second power supply line;

means for monitoring an $i^{th}$ voltage of said $i^{th}$ power supply line;

means for selecting the minimum voltage among said first through said $i^{th}$ voltages;

means for comparing said minimum voltage with a previously set reference voltage; and switching means for starting or halting the power being supplied from said external power source in response to the comparison result.

4. An information processing apparatus according to claim 2, wherein said external power source is a commercially available power source selected from the group consisting of an AC/DC adapter, and a battery.

5. An information processing apparatus according to claim 2, wherein said first electric circuit includes a main memory, a screen buffer, and a display controller.

6. An information processing apparatus according to claim 2, wherein said second electric circuit includes a CPU and a peripheral device.

7. An information processing apparatus according to claim 2, wherein said $i^{th}$ electric circuit includes a display device.

8. A control method for an information processing apparatus, which includes a first power supply line for supplying power to a first electric circuit, a second power supply line for supplying power to a second electric circuit, an $i^{th}$ power supply line for supplying power to an $i^{th}$ electric circuit, i being an integer from 1 to n, and n is an integer at least equal to 2 and wherein said information processing apparatus is activated by power supplied from an external power source, said method comprising the step of:

selecting, as a feedback voltage, the minimum voltage from among those voltages that are carried by said first through said $i^{th}$ power supply lines for comparison with a reference voltage to control power being supplied from said external power source.

9. A control method for an information processing apparatus, which includes a first power supply line for supplying power to a first electric circuit, a second power supply line for supplying power to a second electric circuit, an $i^{th}$ power supply line for supplying power to an $i^{th}$ electric circuit, i being an integer from 1 to n and wherein n is an integer at least equal to 2 and wherein said information processing apparatus is activated by power supplied from an external power source, said method comprising the steps of:

monitoring a first voltage of said first power supply line;

monitoring a second voltage of said second power supply line;

monitoring an $i^{th}$ voltage of said $i^{th}$ power supply line;

selecting the minimum voltage among said first through said $i^{th}$ voltages;

comparing said minimum voltage with a previously given reference voltage; and starting or halting the power being supplied from said external power source in response to the comparison result.

* * * * *